Patented Dec. 6, 1938

2,139,359

UNITED STATES PATENT OFFICE 2,139,359

MIXED TERTIARY ETHERS

Theodore Evans, Martinez, and Karl R. Edlund, Berkeley, Calif., assignors to Shell Development Company, San Francisco, Calif., a corporation of Delaware No Drawing. Original application November 17, 1931, Serial No. 575,634. Divided and this application February 9, 1935, Serial No. 5,854

5 Claims. (Cl. 260—614)

This invention relates to mixed tertiary ethers of the general formula R—O—R' wherein R represents an aliphatic grouping containing not less than four carbon atoms, one of said carbon atoms being bound to the oxygen atom as well as to three other carbon atoms and R'—O—represents an organic residue of a primary or secondary aliphatic alcohol.

We are aware that certain elementary mixed tertiary ethers have been prepared by various processes but to our knowledge no one has prepared the subaltern genera and species which we claim to constitute our invention.

In our co-pending application, Serial Number 547,784 filed June 29, 1931, we have described a novel way of preparing these mixed tertiary ethers, i. e., by reacting a tertiary-base olefine (olefines capable of forming tertiary alcohols by hydration) with a hydroxy compound in the presence of a catalyst, preferably sulfuric acid.

Now we have discovered that when said tertiary-base olefines are reacted with primary or secondary aliphatic alcohols, the mixed tertiary ethers produced (normal as well as isoalkyl ethers) may be used either as such or admixed with other substances, as diluting agents, for solutions of various lacquers and varnishes, for instance, for solutions of nitrocellulose in ethyl acetate, as solvents and as extracting agents for organic substances such as alkaloids, essential oils, essences and the like.

We have prepared mixed ethereal derivatives of tertiary butylene, tertiary amylene, and tertiary hexylene and know that the mixed ethereal derivatives of tertiary heptylene and the higher tertiary-base olefines may be prepared in a similar fashion. More specifically the methyl ether of tertiary heptylene and higher tertiary olefines, the ethyl ethers of tertiary hexylene, tertiary heptylene and higher tertiary olefines, the normal and isopropyl ethers of tertiary amylene, tertiary hexylene, tertiary heptylene and higher tertiary olefines, the normal, iso-and secondary butyl ethers of tertiary amylene, tertiary hexylene, tertiary heptylene and higher tertiary olefines, the normal, iso- and secondary amyl ethers of tertiary butylene, tertiary amylene, tertiary hexylene, tertiary heptylene and higher tertiary olefines may be prepared in the manner set out in the examples which are illustrative only of the specific compounds described:

Example I

Isobutyl tertiary butyl ether.—320 gm. isobutyl alcohol, 36 gm. $H_2SO_4$, and 200 gm. isobutylene are reacted at 75° C. for 1 hour. The mixture is then cooled, poured into dilute caustic and distilled, an azeotrope containing the isobutyl tertiary butyl ether being collected at 82.5° C.–83° C. This material is extracted with an equal volume of dilute (2 volumes $H_2O$ to 1 volume $H_2SO_4$) $H_2SO_4$, the upper layer dried with $K_2CO_3$ and distilled. The pure ether is collected at 113.8° C., some binary isobutyl alcohol-mixed ether azeotrope first coming over at 102° C. (A yield of at least 100 gm. of the pure ether is obtained.)

Example II

Isoamyl tertiary butyl ether.—320 gm. isoamyl alcohol, 36 gm. $H_2SO_4$ and 200 gm. isobutylene are reacted at 75° C. for 2 hours. At the end of this time the mixture is cooled, poured into dilute caustic and distilled. The distillate so obtained is treated with an equal volume of aqueous sulfuric acid (17.5 volumes acid to 20 volumes water), the upper layer dried and distilled, whereby the ether is obtained at 140° C. (Yield of at least 100 gm. pure ether is obtained.)

Example III

Secondary butyl tertiary butyl ether.—250 gm. secondary butyl alcohol, 270 gm. isobutylene, and 18 gm. sulfuric acid are reacted at 75° C. for 1½ hours. The product is poured into dilute caustic and distilled. The ternary azeotrope is collected at 82° C.–83° C. and treated as in the preparation of isobutyl tertiary butyl ether, whereby the ether is obtained at 114° C.–115° C. (The yield is at least 75 gm.)

Example IV

Methyl tertiary hexyl ether.—Tertiary base hexylenes were first prepared by scrubbing a hexane-hexylene cut with 65% $H_2SO_4$, diluting the acid layer with water, and boiling out the hydrocarbons. The material so obtained was further fractionated, the material boiling at 60° C.–72° C. being taken as the desired hexylenes. To convert this to the ether, 350 gm. hexylene, 150 gm. methyl alcohol, and 18 gm. $H_2SO_4$ are reacted at 75° C. for 1½ hours. The reaction mixture is washed twice with an equal volume of dilute caustic, dried and distilled. The desired product, probably a mixture of isomeric methyl tertiary hexyl ethers, is obtained at 113° C.; the yield is at least 75 gm.

This is a divisional application of application Serial No. 575,634, filed November 17, 1931, which has matured into U. S. Patent No. 2,010,356, dated August 6, 1935.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. The mixed tertiary butyl ethers of the formula $(CH_3)_3C$—O—R, in which —O—R represents a branched chain alkoxy radical wherein R is the alkyl radical of an aliphatic alcohol of the class consisting of the aliphatic secondary and aliphatic iso alcohols containing at least five carbon atoms.

2. The mixed tertiary butyl ether of the formula $(CH_3)_3C$—O—R, in which —O—R represents a branched chain alkoxy radical wherein R is the alkyl radical of an aliphatic secondary alcohol containing at least five carbon atoms.

3. The mixed tertiary butyl ether of the formula $(CH_3)_3C$—O—R, in which —O—R represents a branched chain alkoxy radical wherein R is the alkyl radical of an aliphatic iso alcohol containing at least five carbon atoms.

4. The mixed ether: tertiary butyl secondary amyl ether.

5. The mixed ether: tertiary butyl isoamyl ether.

THEODORE EVANS.
KARL R. EDLUND.